Figure 2:
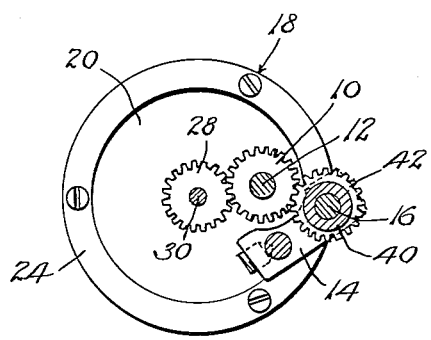

April 10, 1956  E. W. OLSON  2,741,142
APPARATUS FOR ALTERING THE THROW OF CRANK MEANS
Filed April 1, 1952  3 Sheets-Sheet 1
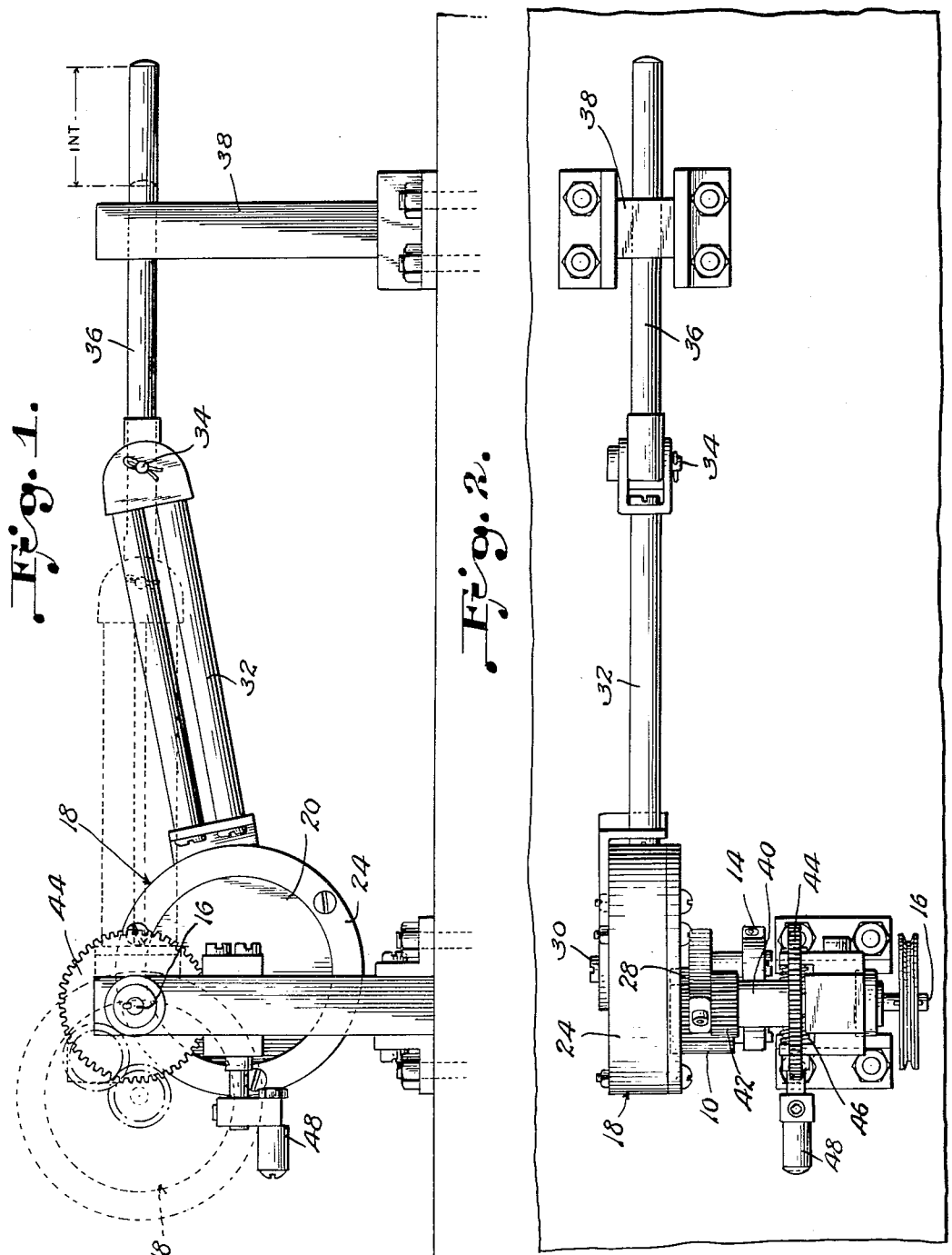
E. W. Olson
INVENTOR
BY *CASnowles.*
ATTORNEYS.

April 10, 1956     E. W. OLSON     2,741,142
APPARATUS FOR ALTERING THE THROW OF CRANK MEANS
Filed April 1, 1952     3 Sheets-Sheet 2
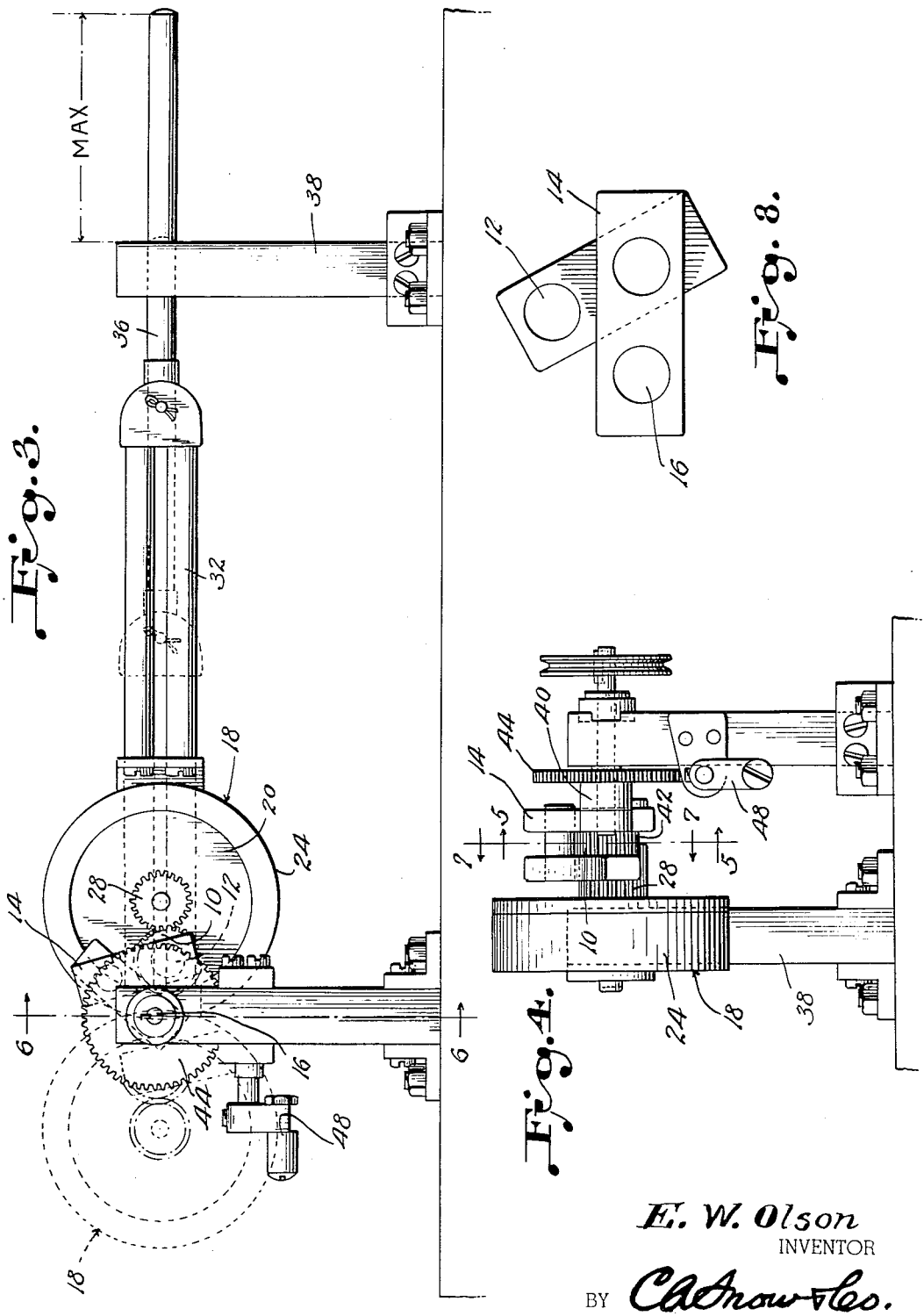
E. W. Olson
INVENTOR
BY C. A. Snow & Co.
ATTORNEYS April 10, 1956  E. W. OLSON  2,741,142
APPARATUS FOR ALTERING THE THROW OF CRANK MEANS
Filed April 1, 1952  3 Sheets-Sheet 3

E. W. Olson
INVENTOR
BY Chnowles.
ATTORNEYS.

United States Patent Office 2,741,142
Patented Apr. 10, 1956

2,741,142

APPARATUS FOR ALTERING THE THROW OF CRANK MEANS

Edgar W. Olson, Los Angeles, Calif.

Application April 1, 1952, Serial No. 279,751

7 Claims. (Cl. 74—600)

This invention relates to apparatus for altering the throw of crank means and has for its primary object to govern the throw of a crank or eccentric from zero to maximum with an infinite number of selected positions between the two extremes.

Another object is to enable the throw of a crank or eccentric to be regulated without stopping its operation.

A further object is to vary the length of stroke of a plunger to meet varying requirements, and permit the length of stroke to be regulated without interfering with the reciprocation of the plunger.

The above and other objects may be attained by employing this invention which embodies among its features a gear mounted to rotate about its own axis and to revolve about a parallel axis, crank means carried by the gear to move in a closed path concentric about the axis of the gear and to revolve with the gear in an orbital path concentric about the parallel axis, and means carried by the crank means and cooperating with the gear for moving the crank means in the closed path when the gear is positively rotated about its own axis.

Other features include means mounted to rotate about the parallel axis and connected to the gear for revolving said gear about the parallel axis and moving the crank means in unison with the gear, and means mounted to rotate about the parallel axis and meshing with the gear for positively rotating said gear about its own axis and revolving the gear and crank means about the parallel axis.

Still other features include a plunger mounted to reciprocate in a rectilinear path which lies perpendicular to the parallel axis, and a connecting rod connected to the plunger and to the crank means for movement by the crank means and reciprocation of the plunger.

This application is a continuation in part of my copending application Serial No. 172,897 filed July 10, 1950 now abandoned.

Figure 5:
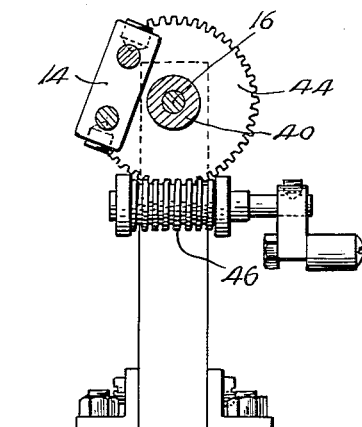
Figure 9:
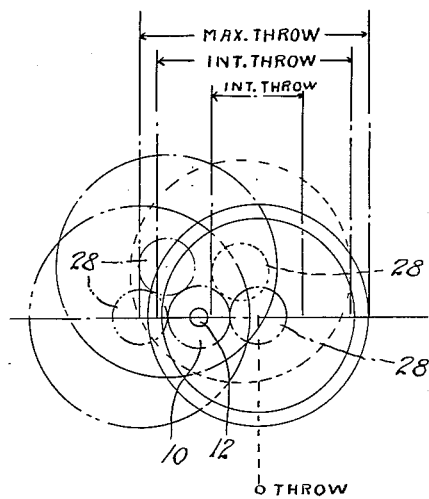
Figure 6:
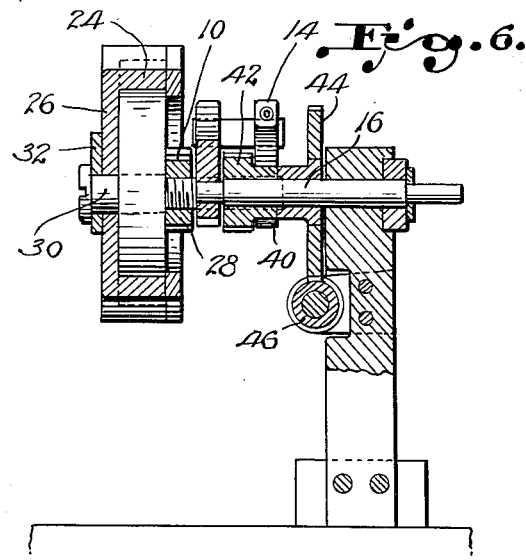

In the drawings,

Fig. 1 is a side view of this invention showing it connected to a reciprocating plunger, Fig. 2 is a top plan view of the structure illustrated in Fig. 1, Fig. 3 is a side view showing the throw of the crank means in its maximum position, Fig. 4 is an end view of the device illustrated in Fig. 3, Fig. 5 is a sectional view taken substantially on the line 5—5 of Fig. 4, Fig. 6 is a sectional view taken substantially on the line 6—6 of Fig. 3, Fig. 7 is a sectional view taken substantially on the line 7—7 of Fig. 4, Fig. 8 is a side view of the crank, and Fig. 9 is a diagrammatic view showing the manner in which the throw of the crank mechanism may be adjusted from zero to maximum.

Referring to the drawings in detail a gear 10 is mounted to rotate about its own axis on a crank pin 12 carried by a crank arm 14 which in turn is fixed through a rigid bell crank connection to a drive shaft 16; which gear is mounted to rotate about its own axis as well as another axis which lies parallel with the axis of the gear 10 and about which parallel axis the gear 10 revolves as the crank shaft 16 is rotated.

Carried by the crank pin 12 for rotation about the axis thereof is a crank means designated generally at 18 which comprises a rotatable eccentric disk 20 encircled by an eccentric strap 24 carrying a plate 26 parallel to and spaced outwardly from the disc 20. A pinion 28 extends beyond the side of the eccentric disk 20 in alignment with the axis thereof and meshes with the gear 10 and is connected to crank pin 12 by gear tooth means therefore. Fixed to the pinion 28 and extending through the crank means or eccentric 18 is a stud 30 to which is connected one end of a connecting rod 32, the opposite end of which is pivotally connected as at 34 to a plunger 36 which is mounted to reciprocate in a rectilinear path in a support 38.

Mounted for rotation on the crank shaft 16 is a sleeve 40 carrying adjacent one end a second pinion 42 which is of the same diameter and carries the same number of teeth as the pinion 28. Like the pinion 28, the pinion 42 meshes with the gear 10 so that upon rotation of the pinion 42, the gear 10 will be moved in a closed path concentric about the axis of the crank shaft 16 occasioning the slippage of crank arm 14 and crank shaft 16 on the driving means, and further causing the pinion 28 to move in an orbital path about the axis of the crank pin 12 and thereby through such movement extend or contract the distance between the axis of the crank shaft 16 and the axis of the crank pin 30. Carried by the sleeve 40 adjacent the end thereof remote from the second pinion 42 is a worm gear 44 secured to sleeve 40 which has meshing engagement with a worm 46 mounted adjacent the crank shaft 16 for rotation about an axis which lies perpendicular to said crank shaft. A hand crank 48 is connected to the worm 46 for rotation thereof. It will thus be seen that by turning the hand crank 48, the worm gear 44 may be rotated about the axis of the crank shaft 16 to positively rotate the gear 10 through the medium of the second mentioned pinion 42.

In use with the crank shaft 16 in motion, the throw of the crank mechanism or eccentric may be governed from zero to maximum by rotating the hand crank 48 to move the pinion 28 in an orbital path concentric about the axis of the gear 10 from a position in which the pinion 28 aligns with the pinion 42 to a position diametrically of the gear 10. When in the latter position, the throw of the crank mechanism will be at its maximum and by adjusting the position of the pinion 28 about the periphery of the gear 10, the throw of the plunger 36 may be varied to suit the requirements.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In apparatus for altering the throw of an eccentric, a gear mounted to rotate about its own axis and to revolve about an axis which lies parallel to its axis of rotation, an eccentric carried by the gear to rotate about the axis of the gear and to revolve in a closed path which lies adjacent the gear, a pinion carried by and extending laterally from one side of the eccentric in alignment with the axis thereof, said pinion meshing with the gear and being movable concentrically about the axis thereof in an orbital path which intersects the parallel axis, and means operatively connected to the gear for revolving said gear about its own axis and moving the pinion in the orbital path and the eccentric in the closed path.

2. The structure defined in claim 1 in which the means for revolving the gear about its own axis includes a second pinion mounted to rotate about the parallel axis and meshing with the gear, and means to rotate said second pinion about the parallel axis.

3. The structure defined in claim 2 in which the means to rotate the second pinion includes a worm wheel mounted to rotate about the parallel axis and operatively connected to the second pinion and a worm mounted adjacent the parallel axis to rotate about an axis which lies perpendicular to the parallel axis in meshing engagement with the worm wheel and means connected to the worm for rotating said worm about the perpendicular axis.

4. In apparatus for altering the throw of an eccentric, a crank arm, a gear mounted on the crank arm to rotate about its own axis and to revolve with the crank arm in a closed path which lies concentric about a parallel axis, a crank shaft connected to the crank arm and mounted to rotate with the crank arm about the parallel axis, an eccentric mounted on the gear to revolve in an orbital path which lies concentric about the axis of the gear, a pinion carried by the eccentric and projecting laterally therefrom in alignment with the axis thereof, said pinion meshing with the gear, a second pinion mounted on the crank shaft for rotation about the axis thereof and means mounted adjacent the crank shaft and operatively connected to said crank arm for rotating it about the crank shaft and revolving the gear in its closed path to thereby revolve the eccentric in its orbital path.

5. The structure defined in claim 4 in which the means for rotating the second pinion includes a worm wheel connected to the second pinion and mounted to rotate about the crank shaft, a worm mounted adjacent the crank shaft for rotation about an axis which lies perpendicular to the parallel axis, and said worm meshing with the worm gear.

6. In apparatus for altering the throw of an eccentric, a gear mounted to rotate about its own axis and to revolve about an axis which lies parallel to its axis of rotation, an eccentric carried by the gear to rotate about the axis of the gear and to revolve in a closed path which lies adjacent the gear, a pinion carried by and extending laterally from one side of the eccentric in alignment with the axis thereof, said pinion meshing with the gear and being movable concentrically about the axis thereof in an orbital path which intersects the parallel axis, means operatively connected to the gear for revolving said gear about its own axis and moving the pinion in the orbital path and the eccentric in the closed path, a plunger mounted to reciprocate in a rectilinear path which lies perpendicular to the parallel axis, and a connecting rod connected to the plunger and to the pinion for movement by said pinion and reciprocation of the plunger.

7. The structure defined in claim 1 in which the eccentric includes an eccentric disk carried by the pinion, an eccentric strap carried by the eccentric disk and the pinion is fixedly supported by the eccentric strap.

References Cited in the file of this patent
UNITED STATES PATENTS

| | | |
|---|---|---|
| 77,181 | Elward | Apr. 28, 1868 |
| 205,368 | Dunbar | June 25, 1878 |
| 421,297 | Mills | Feb. 11, 1890 |
| 1,190,764 | Hazen | July 11, 1916 |
| 1,796,753 | Green | Mar. 17, 1931 |
| 1,829,555 | Criner | Oct. 27, 1931 |